(No Model.) 2 Sheets—Sheet 1.
W. A. FLEMING.
BICYCLE.
No. 471,472. Patented Mar. 22, 1892.
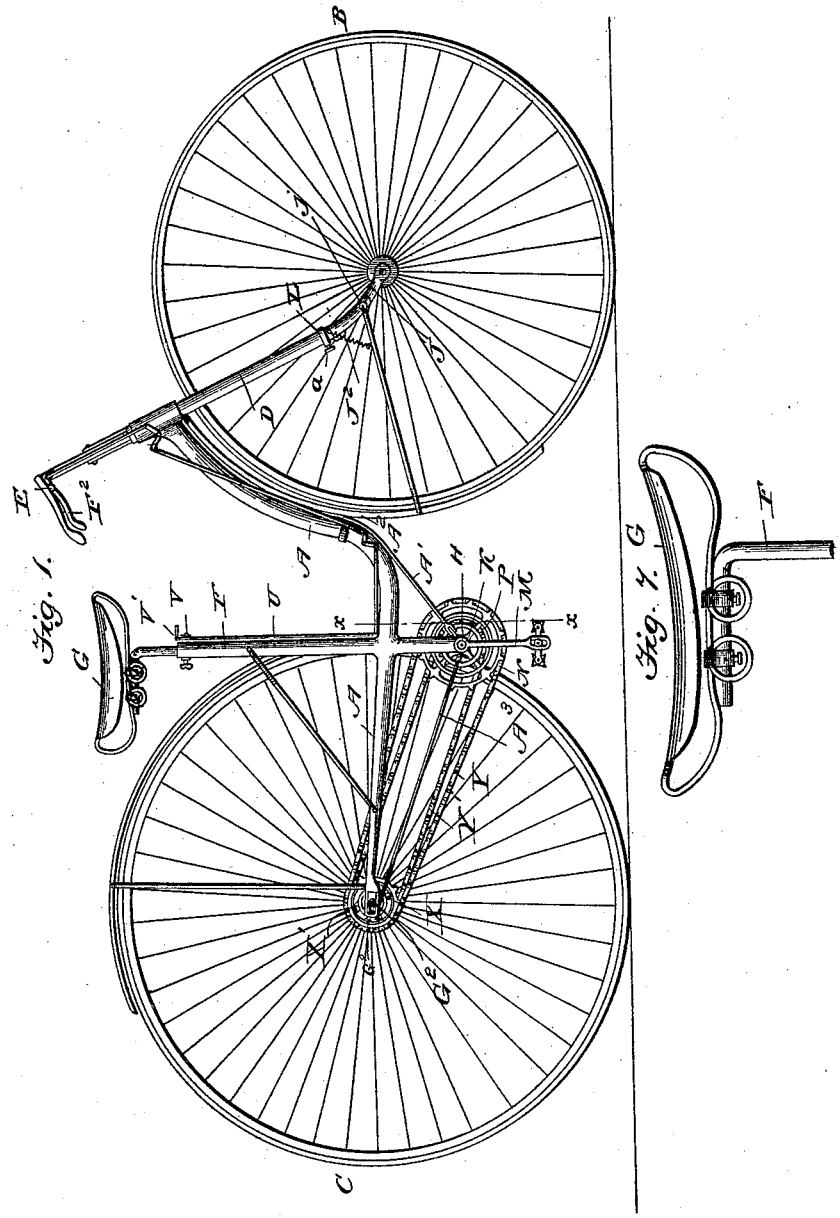
Witnesses
Inventor
Will A. Fleming
By his Attorney in fact
Chas. E. Barber
THE NORRIS PETERS CO., PHOTO-LITHO., WASHINGTON, D. C.

(No Model.) 2 Sheets—Sheet 2.
W. A. FLEMING.
BICYCLE.
No. 471,472. Patented Mar. 22, 1892.
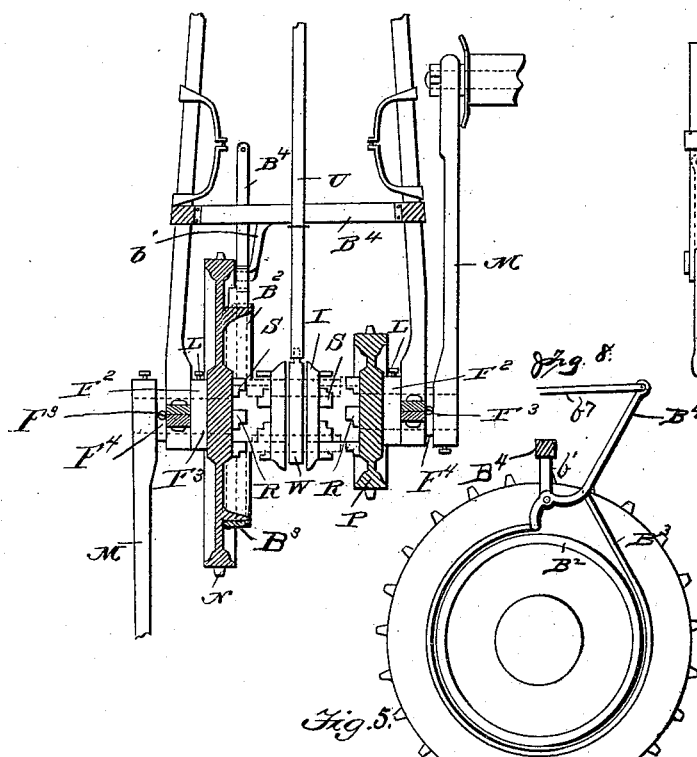
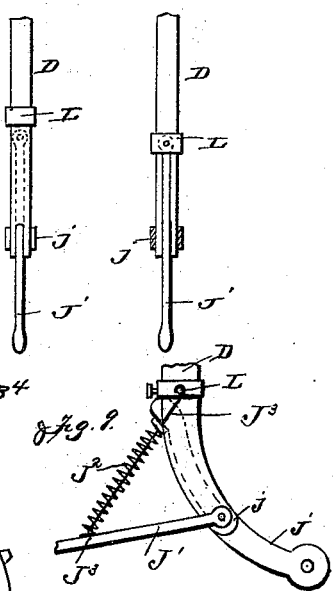
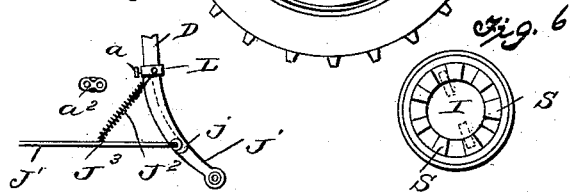
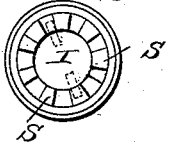
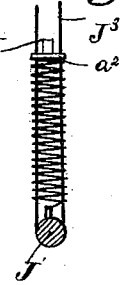
WITNESSES:
Will A. Fleming
INVENTOR
BY Chas. E. Barber
his ATTORNEY in fact
THE NORRIS PETERS CO., PHOTO-LITHO., WASHINGTON, D. C.

UNITED STATES PATENT OFFICE.

WILL A. FLEMING, OF LEWISTON, IDAHO.

BICYCLE.

SPECIFICATION forming part of Letters Patent No. 471,472, dated March 22, 1892.

Application filed June 26, 1891. Serial No. 397,638. (No model.)

*To all whom it may concern:*

Be it known that I, WILL A. FLEMING, a citizen of the United States, residing at Lewiston, in the county of Nez Perces, in the State of Idaho, have invented certain new and useful Improvements in Bicycles, of which the following is a specification, reference being had to the accompanying drawings.

This invention relates to certain new and useful improvements in bicycles; and it has for its objects, among others, to provide an improved machine which can be operated with the utmost ease and smoothness, adapted for use by either ladies or gentlemen, and which shall be strong and durable and cheap of manufacture.

It has for a further object to so construct the frame thereof that wheels of greater diameter than heretofore may be employed, and also to provide for changing the gearing, so as to secure power or speed at the will of the rider without dismounting, or to permit the machine to be used for coasting without removing the feet from the foot-pedals. I provide two drive-chains, either of which may be thrown into action at the will of the operator. I brace the frame in such a manner as enables me to provide a strong light frame and provide for the easy mounting of the same by a lady. The clutch mechanism may be operated from the saddle. The front fork has a pivoted portion, with provisions for making the same a practically rigid fork when desired. A spring is employed to connect this fork to the frame-work that holds the mud-guard.

Other objects and advantages of the invention will hereinafter appear, and the novel features thereof will be specifically defined by the appended claims.

The invention is clearly illustrated in the accompanying drawings, which, with the letters of reference marked thereon, form a part of this specification, in which—

Figure 1 is a side elevation of a bicycle embodying my invention. Fig. 2 is an enlarged section taken on the line *x x* of Fig. 1. Fig. 3 is a detail of the lower end of the front fork and its sliding ring. Fig. 4 is a view of the same parts with the ring in a different position. Fig. 5 is a view of the same parts, looking at right angles to Figs. 3 and 4. Fig. 6 is an end view of the collar detached. Fig. 7 is a side elevation of the saddle and its post. Fig. 8 shows the manner of applying the brake and the lever for applying the same. Figs. 9 and 10 are detail views.

Like letters of reference indicate like parts throughout the several views in which they occur.

Referring now to the details of the drawings by letter, A designates the main frame of the machine, the forward end of which is bent upward over the front wheel B and to which at the point $A^2$ are secured the front diagonal braces A', said frame having a horizontal portion and being bifurcated, as shown, so as to embrace the rear wheel C at each side thereof. The forward end of the frame is provided with a bifurcated standard D, which embraces the front wheel B, and is provided at its upper end with the usual cross-bar and handles E, whereby the bicycle is guided. The shafts of the respective wheels have their journal-bearings respectively at the ends of the bifurcated standard and the rear portion of the bifurcated frame A. The bifurcated standard is provided with a hinged joint *j*.

J' is the easy-arm, and $J^2$ the spring that is secured at one end to the upper end of the easy-arm and is so arranged that it takes up and breaks the jar when the wheel comes in contact with rough surfaces or obstructions, thereby making it much easier on both the bicycle and the rider.

L is a safety-sleeve so arranged that it can be dropped down to engage the upper end of the easy-arm, as shown in Fig. 4. In Fig. 3 it is shown as raised, so as to disengage the said upper end of the easy-arm. This sleeve is provided with any suitable means for holding it in its adjusted positions. Such means may consist of a thumb-screw *a*. When this sleeve or collar is in the position in which it is shown in Fig. 4 I have a stiff standard; but when it is in the position in which it is shown in Fig. 3 the arm is permitted to rest upon the spring, so that if by accident the spring should break the machine will still be in good riding condition. The easy-arm J' works between the sides and against the front of the main standard, as shown in Fig. 4, thereby preventing the joint working loose by lateral movement caused by turning the machine. The spring $J^2$ is fastened on a bifurcated frame $J^3$, which is secured to the standard. This frame is attached at its lower end to the brace $j'$, which prevents it from swinging or rattling. The upper end of the arm $J'$ works between the bifurcated frame $J^3$, which is provided with means for adjustment at the bottom, so that the said spring can be set to suit the operator or rider. The spring is provided with a cap $a^2$ to cover the upper end of the spring, the cap being provided with openings, as seen in Fig. 5, to fit over the frame $J^3$, the center of the cap being provided with a cone-shaped bearing to engage the back and top part of the easy arm $J'$ in a recess provided for the same, so that the bearing on the said spring will be even and will cause the spring to work easily and smoothly. The main frame is depressed below the point $A^2$, so as to bring the major portion of the weight below a direct alignment of the bearings, thus making it much easier to mount and dismount and fitting the machine for use by ladies. The diagonal braces $A'$ are secured to the main frame at the point $A^2$ above the depressed part of the frame, thereby greatly strengthening the frame at the said depressed point and making a much stronger and lighter frame, as the strain on the diagonal braces at the point $A^2$ is in direct alignment with the front portion. The lower ends of the braces are secured to the lower end of the frame in such a manner that they form a guard for the sprocket-wheels, as seen clearly in Fig. 1.

F designates a bifurcated standard secured to the main frame between the forward and rear wheels, and upon the upper end of which is mounted the seat G and to the lower ends of which are secured the rear ends of the front diagonal braces $A'$, as seen in Fig. 1, the front ends of the rear diagonal braces $A^3$ thus forming a double-truss brace, which serves to hold the ends of the standards against accidental displacement both longitudinally and transversely and also holding the standard and seat firmly in position vertically. Between the lower ends of said standard F, in suitable bearings H in the said lower end, is journaled a pedal-shaft K, secured by collars $F^2$ $F^4$, fastened, respectively, by set-screws L and $F^3$, by means of which the said shaft is held in position, the shaft being provided at its outer ends with the usual pedal-levers M, upon which are carried the pedals, which may be of any of the well-known or approved forms of construction. Upon this shaft are loosely mounted two sprocket driving-wheels N and P, which are capable of turning independently of the shaft, the hubs of the said sprocket-wheels at their adjacent inner faces being provided with clutch recesses and teeth R, with similar recesses and teeth S on the transversely-movable collar I, mounted on the pedal-shaft and adapted to be engaged with the said sprocket-wheels, the said collar being splined to the shaft, so that while it may be shifted thereon it will be rotated therewith.

U designates a lever fulcrumed at V to the vertical standard F, which supports the seat, the upper end of the lever being provided with a suitable handle and ratchet $V'$ and so arranged that it holds the lever in the position desired by the rider and is within easy reach of the rider, while the lower end is bent backward and is connected with the collar W, which collar is adjustable in a circumferential recess in the collar I, by means of which the said collar may be moved to cause it to engage with either of the sprocket-wheels N or P, as may be desired, or disengaged entirely for coasting. Upon the axle of the rear wheel are rigidly mounted two sprocket-pulleys X and $X'$, which are connected with the sprocket-wheels N and P by means of the sprocket-chains Y and $Y'$, as shown in Fig. 1. The rear ends of the bifurcated frame A are so arranged that the bearings can be adjusted to take up the slack of the chains caused by wear. This is done by means of the screw $G^2$. The braces $A'$ and $A^3$ are so arranged that the seat can be slanted back, if desired. The top of the standard is so arranged that the handle can be adjusted to any position desired. The sprocket-wheel N is provided with a lateral annular rim or flange $B^2$, on which to apply a brake strap or band $B^3$, the brake-band being attached to the brake-lever, which is pivoted to an arm $b'$, extending from the cross-bar $B^4$. The brake-lever is connected by intermediate connecting-rods $b^7$ $b^8$ and crank-levers $b^9$ $b^{10}$, pivoted on the frame, as shown in Fig. 1. The teeth and recesses of the sprocket-wheels and collar are so constructed that they may be caused to engage or disengage while the machine is in rapid motion if the rider so desires, and are so constructed that the rider can control the machine by his feet in place of the brake should he so desire. The construction and operation of these parts will be best understood from Fig. 2.

The operation will be readily understood, and is as follows: When the collar I is in the position in which it is shown in Fig. 2, the machine is in condition for coasting, as neither of the sprocket-wheels N or P are engaged. When the rider wishes to speed, he shifts the collar by means of the lever U to the right and engages the wheel N, which will then rotate with the shaft, and its motion will be transmitted by means of the sprocket-chain Y to the rear axle and wheel. The wheel P in the meantime will run idly on its bearings. When it is desired to apply more power, as in climbing heavy grades, the clutch-collar I is shifted to the left to disengage the sprocket-wheel N and engage the wheel P, in which case the wheel N runs idly on its bearings, and the wheel P through its chain Y' communicates motion to the rear axle and wheel. It will thus be seen that by the construction above described I provide a machine which can be readily and quickly changed for either speed, power, or coasting without the rider removing his feet from the pedals, and that by the peculiar construction of the frame a much larger wheel than heretofore can be employed; also, by the peculiar construction of the main frame with its depression and its braces a lighter frame will sustain a heavier load than others of the same weight, and the peculiar construction and arrangement of the easy-arm and its spring with the front fork makes it much easier both on the machine and the rider, and in case of accident the machine can be readily repaired by means of the sleeve, which makes it a rigid fork instead of a yielding one.

Modifications in detail may be resorted to without departing from the spirit of the invention or sacrificing any of its advantages.

What I claim as new is—

1. In a bicycle, the combination, with the standard D, the easy-arm, and the mud-guard brace, of a spring between said easy-arm and brace, substantially as shown and described.

2. In a bicycle, the combination, with the front standard, the easy-arm pivoted thereto, and the mud-guard brace, of a spring between said arm and brace, a frame to support said spring, and a cap interposed between the easy-arm and spring and guided and retained by said frame, substantially as shown and described.

In testimony whereof I affix my signature in the presence of two witnesses.

WILL A. FLEMING.

Witnesses:
S. S. ROGERS,
J. M. HOWE.